US007089581B1

(12) United States Patent
Nagai et al.

(10) Patent No.: US 7,089,581 B1
(45) Date of Patent: Aug. 8, 2006

(54) SECURITY SYSTEM DESIGN SUPPORTING METHOD

(75) Inventors: Yasuhiko Nagai, Tokyo (JP); Tatsuya Fujiyama, Yokohama (JP); Masato Arai, Yokohama (JP); Mitsuhiro Tsunoda, Kawasaki (JP); Tomoaki Yamada, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 873 days.

(21) Appl. No.: 09/640,016

(22) Filed: Aug. 17, 2000

(30) Foreign Application Priority Data

Nov. 30, 1999 (JP) ................................ 11-339304

(51) Int. Cl.
*G06F 9/44* (2006.01)

(52) U.S. Cl. ................... 726/1; 726/2; 726/3; 713/166; 717/104; 717/106; 717/110; 717/144

(58) Field of Classification Search ................ 713/200, 713/166; 717/104, 106, 110, 144, 156, 159; 726/1–3

See application file for complete search history.

(56) References Cited

U.S. PATENT DOCUMENTS 5,588,056 A * 12/1996 Ganesan ..................... 713/183
5,850,516 A * 12/1998 Schneier ...................... 726/25
6,405,364 B1 * 6/2002 Bowman-Amuah ......... 717/101
6,484,261 B1 * 11/2002 Wiegel ........................ 726/11

FOREIGN PATENT DOCUMENTS

EP 1065 861 * 6/1999

OTHER PUBLICATIONS

Automated Password Generator (APG), SIPS PUB 181, Oct. 5, 1993, pp. 1-9 downloaded from the Internet, Feb. 2, 2005.*

Information System Security Design Methods: Implementation for Information Systems development, Richard Baskerville, ACM Computing Surveys, vol. 25, No. 4, pp. 375-414, Dec. 1993.*

ISO/SC27 N2333 Guide for Production of Protection Profiles and Security Targets Version 0.8, Jul., 1999.

"Information Technology security evaluation standards", pp. 26-33, ISO/IEC 15408 Seminar Materials (Sep. 8, 1999, sponsored by Information Promotion Agency, Security Center in Japan).

(Continued)

*Primary Examiner*—Ayaz Sheikh
*Assistant Examiner*—Taghi T. Arani
(74) *Attorney, Agent, or Firm*—Mattingly, Stanger, Malur & Brundidge, P.C.

(57) ABSTRACT

A security system design supporting tool and method are disclosed, in which security requirements (PP) and security specifications (ST) used for designing a product or a system (TOE) based on CC requirements can be prepared efficiently and uniformly even by ordinary designers other than specialists. In a security system design supporting method, registered PPs and past PP/ST generation cases are so structured as to reuse and/or reference as templates, a draft is automatically generated, and the draft thus generated is additionally modified or corrected by partial automatic generation utilizing a database of past generation cases and partial case accumulated in the generation process thereof.

3 Claims, 13 Drawing Sheets

OTHER PUBLICATIONS

"Common Criteria: An Introduction", pp. 1-19.

"Common Criteria: Common Criteria for Information Technology Security Evaluation User Guide" Oct. 1999, pp. 1-41.

NIAP-National Information Assurance Partnership, Protection Profiles, Jan. 4, 2006.

The Common Criteria: Evaluation and Validation Scheme Validated Protection Profiles, Jan. 4, 2006, pp. 1-5.

Common Evaluation Methodology for Information Technology Security, Part 1, Introduction and General Model, Jan. 11, 1997, pp. 1-24.

Common Criteria: Common Methodology for Information Technology Security Evaluation, Aug. 2005, pp. 2-360.

Common Criteria: Common Criteria for Information Technology Security Evaluation, Part 3, Security Assurance Requirements, Aug. 2005, pp. 2-196.

Common Criteria: Common Criteria: Common Criteria for Information Technology Security Evaluation: Part 2: Security Functional Requirements, Aug. 2005, pp. 2-325.

Common Criteria: Common Criteria for Information Technology Security Evaluation: Part 1: Introduction and General Model, Aug. 2005, pp. 2-61.

* cited by examiner

FIG.8

205

701 COMPONENT ELEMENT/ ENVIRONMENT CORRESPONDENCE TABLE

| ELEMENTS | ASSUMPTIONS | THREATS | ORGANIZATIONAL POLICIES |
|---|---|---|---|
| CompX | A-XXX | T-XXX | P-XXX |
| ⋮ | ⋮ | ⋮ | ⋮ |

702 ENVIRONMENT/OBJECTIVE CORRESPONDENCE TABLE

| ENVIRONMENTS | OBJECTIVES |
|---|---|
| A-XXX | O-AXX, O-AYY, O-AZZZ |
| ⋮ | ⋮ |
| P-XXX | O-PXX,O-PYY |
| ⋮ | ⋮ |
| T-XXX | (O-TXX, O-TYY), (O-TZZ) |
| ⋮ | ⋮ |

703

704 THREATS DATA TABLE

| THREATS | PROBABILITY OF OCCURRENCE | AFFECTED LOSS AMOUNT (YEN) |
|---|---|---|
| T-XXX | 0.004 | 1000.000 |
| ⋮ | ⋮ | ⋮ |

705 PROTECTION COST DATA TABLE

| COUNTERMEASURES (OBJECTIVES) | PROTECTION COST (YEN) |
|---|---|
| O-TXX | 10,000 |
| ⋮ | ⋮ |

706 OBJECTIVE/CC REQUIREMENT CORRESPONDENCE TABLE

| OBJECTIVES | CC FUNCTIONAL REQUIREMENTS |
|---|---|
| O-TXX | FAU_GEN.1,FAU_STG.1 |
| ⋮ | ⋮ |

706 CC REQUIREMENTS/IMPLEMENTATION SCHEME CORRESPONDENCE TABLE

| CC FUNCTIONAL REQUIREMENTS | IMPLEMENTATION SCHEME |
|---|---|
| FAU_GEN.1 | ImpX |
| ⋮ | ⋮ |

SECURITY SYSTEM DESIGN SUPPORTING METHOD

BACKGROUND OF THE INVENTION

The present invention relates to a security system design supporting method for designing the security measures for an information system or a product in its planning or design stage and a design supporting tool based on the same method.

The common criteria for security evaluation (hereinafter referred to as CC) internationally standardized stipulates the basic functional requirements for security, the assurance requirements for the functional quality and seven stages of evaluation assurance levels necessary for an information system or a product.

The person in charge of the user information, the product developer and the system engineer (SE) for designing and constructing a system selects the factors required for the product or system involved from the CC requirements thereby to prepare security requirements (protection profile, hereinafter called the PP) and security specifications (security target, hereinafter referred to as ST) to carry out the development and construction.

Also, an evaluation and certification scheme based on this standard is established, so that the evaluation and certification are acquired from designated evaluation and certification bodies.

After the standardization, the construction, the acquired evaluation and certification based on the CC are utilized for all information-related products and systems as purchase requirements for customers, requirements for network connection, a condition for system operation, a legal system and a business system. Thus the acquisition of the certification becomes an essential condition.

In view of this, a guide and a support tool for supporting the work of preparing the PP/ST essential in the planning/design stage for acquisition of the certification have been developed.

A technique for supporting the documentation of the PP/ST by proposing the items to be described in each chapter of the PP or ST specification, a format of expression and case samples is described in "ISO/SC27 N2333 Guide for Production of Protection Profiles and Security Targets Version 0.8, July, 1999" and the reference "Information Technology security evaluation standards", pp. 26–33, ISO/IEC 15408 Seminar Materials (Sep. 8, 1999, sponsored by Information Promotion Agency, Security Center in Japan).

The aforementioned conventional CC-based security design supporting technique basically supports only the matching of the format of the PP/ST specifications, and the technique for introduction of the specific information and the definition support are required to be prepared from the very beginning each time for each product or system involved.

Therefore, although the format adjustment of the PP/ST and the extraction and definition of the contents of description are possible as a procedure, the problem is that the person in charge of preparation is required to be equipped with the special knowledge of CC, security threats and countermeasures and the special technique for risk assessment. As a result, a vast amount and steps of labor are imposed and the quality of the prepared PP/ST which depends on the knowledge and ability of the person in charge of preparation lacks uniformity.

Further, the PP should inherently be reused and shared by product/system designs of the same type, and the prepared PP granted a successful evaluation by a designated evaluation body and registered in a designated PP registration body is basically required to be utilized for designing products or systems of the same type to which the registered PP is applied.

The conventional CC-based security design supporting technique described above, however, fails to support the reuse of the registered PP or the past cases of preparation as a supporting tool.

SUMMARY OF THE INVENTION

The object of the present invention is to provide a CC-based security system design supporting method and a support tool based on the method, in which even designers not equipped with the special knowledge or knowhow of the CC, threats or countermeasures or risk assessment can prepare the PP/ST while at the same time improving the efficiency of preparation steps and assuring uniform quality of preparation by effectively using the registered PP and the past cases of ST preparation and the portions thereof as templates or parts or utilizing them as reference information.

In order to achieve the object described above, according to one aspect of the invention, there is provided a security system design supporting tool and method, comprising:

a case/knowhow database (DB) considering the registered PPs and each PP of a PP family as an object class of an object-oriented design, where the PP family is defined as a plurality of PPs having the same security objective but different CC function components and different assurance components;

a group of DBs for utilization of reference registration cases and information including a registered PP and PP family tree structured DB with each P stored in a class tree structure based on the class inheritance between PPs, and a CC (CEM)/PKG structured DB for storing the CC requirement components, CEM (CC-based reference evaluation methodology) evaluation components and and registered package (PKG) in accordance with the hierarchical structure of the standardized class family components and between the components, wherein the package (hereinafter called PKG) is a combination of functional components and assurance components defined for the purpose of reuse constituting a partial and intermediate entity not making up a complete PP; a local PP/ST tree structured DB for storing the PPs including the existing PP/STs other than in reference registration in a class tree structure based on class inheritance between PP/STs in a similar manner to the aforementioned case;

a group of DBs for utilizing the local cases and information other than in reference registration including an expanded CC/PKG structured DB for storing PKGs and CC requirement components not in reference registration and additionally expanded and defined uniquely; and a corresponding knowhow DB including partial cases of the past PP/ST preparation case parts such as corresponding case parts of threats (including the occurrence probability data), assumptions and/or organizational security policies related to the component elements of the product or system to be designed, corresponding case parts of the security objectives (including the protection cost/risk acceptance data) related to the threats, assumptions and/or organizational security policies, corresponding case parts of the CC requirement components related to the security objectives and corresponding case parts of the implementation schemes related to the CC requirement components.

Means for supporting the semi-automatic preparation of the PP/ST using the information stored in the registered and unregistered case DBs and the corresponding knowhow DBs include:

means (111 in FIG. 1) for selectively designating a corresponding or related one of icons displayed in a class tree structure on a screen corresponding to PP/STs stored in a registered PP/PP family tree structured DB and a local PP/ST tree structured DB and indicating component elements, types and required certification levels of a product or a system to be designed, automatically retrieving and integrally editing a related PP/ST for each chapter and automatically generating a template of the PP/ST to be designed;

additional environment definition means for adding and/or correcting, with reference to a corresponding knowhow DB, definition information of the assumptions, threats and organizational security policies in the security environment of a PP/ST draft automatically prepared according to Chapter 3 in PP/ST (112 in FIG. 1);

environment-to-objective mapping means (113 in FIG. 1) for adding and/or correcting a security objective of the draft according to Chapter 4 by automatically mapping added/corrected security environmental information to a corresponding security objective by reference to corresponding knowhow DB information;

means (114 in FIG. 1) for setting a risk value (probability of threat occurrence multiplied by magnitude of effect) of each threat defined in Chapter 3 and the cost of executing each security objective defined in Chapter 4 by reference to the corresponding knowhow DB or calculation support, interactively selectively setting the constraints for objective optimization (risk acceptance, cost limit value, risk-to-cost ratio) and an objective function (cost minimization function, protection risk maximization function), determining and solving combinational optimization problem under set conditions thereby to determine a combination of optimal security objectives under the set conditions, and making it possible to correct the threats under Chapter 3 and the security objectives against threats under Chapter 4;

means (115 in FIG. 1) for defining the security requirements under Chapter 5 by automatically mapping CC requirement components corresponding to security objectives determined in Chapter 4 with reference to a CC (CEM)/PKG structured DB, an expanded CC/PKG structured DB and the corresponding knowhow DB;

means (116 in FIG. 1) for automatically mapping implementation schemes corresponding to CC requirement components defined by the security requirements under Chapter 5 for ST preparation by reference to the corresponding knowhow DB and defining the contents of the summary specification (implementation scheme) of TOE (target of evaluation) system under Chapter 6;

means (117 in FIG. 1) for automatically preparing a rationale matrix table indicating the correspondence between the items of the environment, the objective, the CC requirements and the implementation scheme defined in and after Chapter 2 (not including the implementation scheme for PP preparation), verifying the presence or absence of other than corresponding items, and defining the contents of the rationale under Chapter 8; and means (118 in FIG. 1) for displaying in the form of check list CC assurance requirements and CEM PP/ST evaluation item information stored in the CC (CEM)/PKG structured DB and simply evaluating the PP/ST prepared interactively based on the PP/ST prepared by the aforementioned means.

According to another aspect of the invention, there is provided a security system design supporting method for supporting the design of the security requirements and the security specifications based on the international security evaluation criteria in the planning and/or designing stage of an information-related product or an information system, using a template case database for storing a class tree structure of the internationally-registered PPs or the past PP/STs not internationally registered, based on the inheritance between the product and/or system types for the particular PP/STs, wherein the component elements, type and certification level of the TOE are designated, the TOE-related PP/STs are specified by retrieving the tree, and the PP/ST draft of the TOE is automatically generated by integrally editing the contents of the definition of the specified PP/STs.

According to still another aspect of the invention, there is provided a security system design supporting method using a partial case database for storing the security environment (assumptions, threats and organizational policies) corresponding to the component elements of the products and/or systems accumulated by the PP/ST construction cases, the security objectives corresponding to the security environment, the security evaluation criteria corresponding to the security objectives and the corresponding information of the implementation schemes corresponding to the security evaluation criteria, wherein the component elements, the security environment, the security objectives and the security evaluation criteria are designated and automatically mapped to the corresponding information thereby to automatically generate the part of the TOE related to the contents of the PP/ST definition.

According to yet another aspect of the invention, there is provided a security system design supporting method, in which the PT/ST draft automatically generated is partially added to and/or corrected by use of the security system design supporting methods described above.

According to a further aspect of the invention, there is provided a security system design supporting method, in which the PP/STs stored in the template case database are expressed as icons with identifiable component elements, types and the certification levels, the TOE-related PP/STs can be specified from the inheritance tree displaying the reference PP/ST cases in a tree, and a TOE configuration diagram is prepared with the icons of the specified PP/STs as component elements.

According to a still further aspect of the invention, there is provided a security system design supporting method, in which the contents of definition from the internationally registered PPs and the past PP/STs not internationally registered can be identified by the character font, the character style, the character size and color when integrally editing the contents of definition.

According to a yet further aspect of the invention, there is provided a security system design supporting method, in which the probability of occurrence of each threat and the affected loss amount data, together with the protection cost data of each security objective, are stored and accumulated in a partial case database, the optimization problem is standardized by designating and combining the evaluation functions for cost minimization or protection risk maximization with the constraints including the risk acceptance, cost limit value and the residual risk-to-protection cost ratio with respect to the relation between the risk of each threat (probability of occurrence multiplied by affected loss amount) and the protection cost of the corresponding security objectives, and the cost-effective optimal security objective is determined by solving the optimization problem.

According to another aspect of the invention, there is provided a security system design supporting method comprising the step of verifying whether the requirements of the contents of definition automatically generated match the interdependency or hierarchy between the functional requirements and the assurance requirements of the reference specification based on the interdependency or hierarchy, respectively, of the reference specification.

According to still another aspect of the invention, there is provided a security system design supporting method comprising the step of automatically generating a rationale matrix expressing in a matrix table each correspondence constituting a part of the definition contents of the PP/STs from the defined security environment, the security objective, the security criteria and the implementation scheme or the correspondence between them, and the step of verifying the presence or absence of the definition information lacking the correspondence.

According to yet another aspect of the invention, there is provided a security system design supporting method comprising the step of storing the new information added in the PP/ST preparation process and the result of PP/ST preparation in accordance with the inheritance or correspondence of the template case database or the partial case database thereby to improve and expand the information stored in the case database.

According to a further aspect of the invention, there is provided a security system design supporting method, in which a PP/ST evaluation check list in the form of questions can be displayed and evaluated based on the international security evaluation method.

According to a still further aspect of the invention, there is provided a security system design supporting tool comprising:

case/knowhow databases for utilization of reference registered cases and information including a registered PP/PP family tree structured database for storing the registered PPs and PP families in tree structure based on the class inheritance between the PPs, and a reference information structured database for storing the requirement components of the security standard, the evaluation components for the security evaluation method and the registered packages in accordance with the class family components of the reference specification and the hierarchical structure between the components;

databases for utilization of local cases and information not in reference registration including a local PP/ST tree structured database for storing the existing PP/STs not in reference registration in a tree structure based on the class inheritance between the PP/STs in a manner similar to the aforementioned case and an expanded reference information structured database for storing the security requirement components and packages not in reference registration and uniquely added or expanded in definition; and a corresponding knowhow database constituting partial cases of the past PP/ST preparation cases, including the corresponding case parts of the threats (including the probability of occurrence and the affected loss data), assumptions and organizational policies related to the component elements of the TOE product or system, the corresponding case parts of the security objectives (including the protection cost data) related to each threat, assumption and/or organizational policy, the corresponding case parts of the security requirement components related to the security objectives and the corresponding case parts of the implementation schemes related to the security requirement components.

According to a yet further aspect of the invention, there is provided a security system design supporting tool, wherein the means for supporting the semi-automatic preparation of the PP/ST using the information stored in the case/corresponding knowhow databases includes:

means for automatically generating a template of the PP/ST of the TOE, in which the component elements, type and the required certification level of the TOE product or system are selectively designated as related or relevant ones of icons displayed in a class tree structure corresponding to the PP/STs stored in the registered PP/PP family tree structured database and the local PP/ST tree structured database, and the related PP/STs are automatically retrieved and integrally edited for each chapter of;

additional environment definition means for adding and/or correcting the definition information of the assumptions, threats and the organizational security policies in the security environment of the automatically prepared PP/ST draft under Chapter 3 with reference to the corresponding knowhow database information;

environment-to-objective mapping means for adding and/or correcting the security objectives of the draft under Chapter 4 by automatically mapping the added/corrected security environment information to the corresponding security objective with reference to the corresponding knowhow database information;

means for setting the risk value of each threat (probability of threat occurrence multiplied by the affected loss amount) defined under Chapter 3 and the protection cost for each security objective defined under Chapter 4 by reference to the corresponding knowhow database or supportive arithmetic operations, interactively selectively setting the constraints for objective optimization (risk acceptance, cost limit value and risk-to-cost ratio) and the objective function (cost minimization function and protection risk maximization function) thereby to solve the optimal combination problem under the set conditions and thus determine an optimal combination of security objectives under the set conditions, and correcting the threats under Chapter 3 and the security objectives for protection against the threats under Chapter 4 based on the determined objectives;

means for defining the security requirements under Chapter 5 by automatically mapping the security requirement components corresponding to the security objectives determined under Chapter 4 with reference to the reference information structured database, the expanded reference information structured base and the corresponding knowhow database;

means for defining, for the preparation of the ST, the contents of the summary specification of the TOE system involved under Chapter 6 by automatically mapping the implementation schemes corresponding to the definition requirement components of the security requirements under Chapter 5 by reference to the corresponding knowhow database;

means for defining the contents of the rationale under Chapter 8 by automatically generating the rationale matrix table indicating the correspondence between the items including the environment, objectives, security requirements and the implementation schemes defined in and after Chapter 2 and verifying the presence or absence of items lacking the correspondence; and means for evaluating in simplistic fashion the PP/STs prepared interactively and indicating, in the form of check list, the assurance requirements stored in the reference information structured database and the PP/ST evaluation item information of the security evaluation method.

According to another aspect of the invention, there is provided a security system design supporting tool comprising a design support service server including databases and tools, wherein the tools are downloaded by the user client connecting the design supporting service server to the network thereby to access a shared database.

According to still another aspect of the invention, there is provided a security system design supporting service comprising a plurality of design support service severs for different organizations, wherein each of the servers includes distributed database link means whereby the case/knowhow DBs of a plurality of the organizations can be used as a virtual unified database through the network.

According to a yet further aspect of the invention, there is provided a security system design supporting service comprising a private organization installed with the aforementioned design support service server, a domestic reference institution or a specific industry-wide organization installed with a reference providing server for storing a PP/PP family tree structured database registered domestically or industry wide, a local PP/ST tree structured database and an expanded reference information structured database, an international PP registration institution installed with an international reference providing server for storing an internationally registered PP/PP family tree structured database and a reference information structured database, and information update monitor control means installed in a private organization design supporting service server for monitoring the updating of the information of an international organization or a domestic or industry-wide organization server, and upon detection of an update, downloading the latest information to the private organization server, thereby making it possible to utilize the case information of different hierarchical levels of international and domestic organizations or different applicable industries through the network.

Other objects, features and advantages of the present invention will become apparent from the description of the following embodiments of the invention taken in conjunction with the accompanying drawings.

BRIEF DESCRIPTION OF THE DRAWINGS

FIG. 8 is a diagram showing a configuration of a corresponding knowhow database.

DESCRIPTION OF THE EMBODIMENTS

Embodiments of the invention will be explained below with reference to the drawings.

An explanation will be given of the configuration and operation of a security system design supporting tool of stand-alone type for preparing a PP/ST specification according to a first embodiment.

Figure 1:
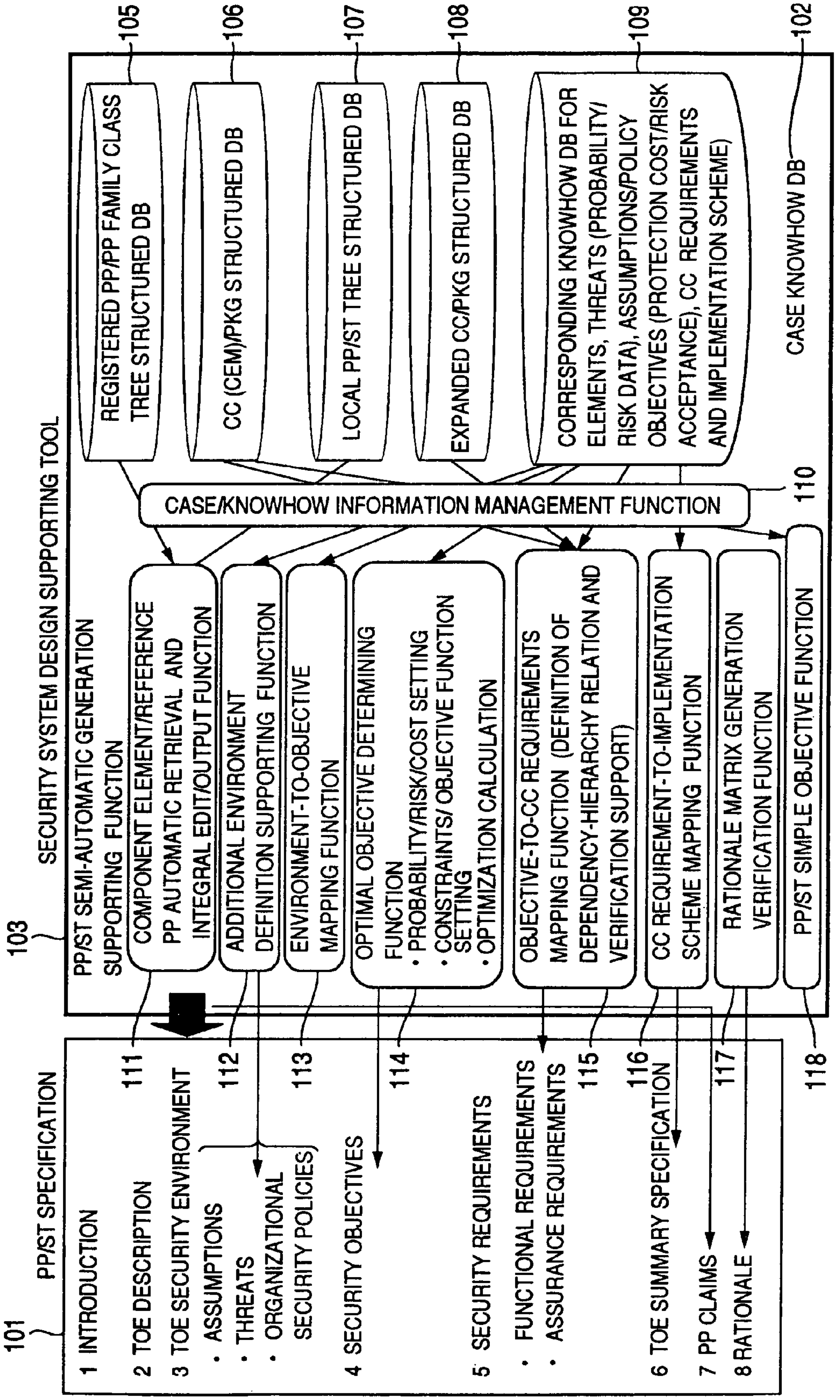
FIG. 1 is a diagram schematically showing general features of a security system design supporting tool according to this invention.

FIG. 1 shows general features of a security system design supporting tool according to the invention.

This tool for supporting the preparation of a PP/ST specification 101 of a specified format comprises a case/knowhow database 102 for reusing and effectively utilizing the reference specification/registered case information stored in a registered PP/PP family class tree structured database 105 and a CC (CEM)/PKG structured database 106 on the one hand and the local case parts information other than in reference registration obtained as the result of the past PP/ST generation such as a local PP/ST tree structured database 107, an expanded CC/PKG structured database 108 and a corresponding knowhow database 109 on the other hand, and a PP/ST semi-automatic generation function 103 for automatically generating the PP/ST draft for the new TOE and interactively supporting the addition and/or correction of the particular draft. A general configuration of the generation function 103 is as described above, and information are exchanged with the databases by the case/knowhow information management function 110.

Figure 2:
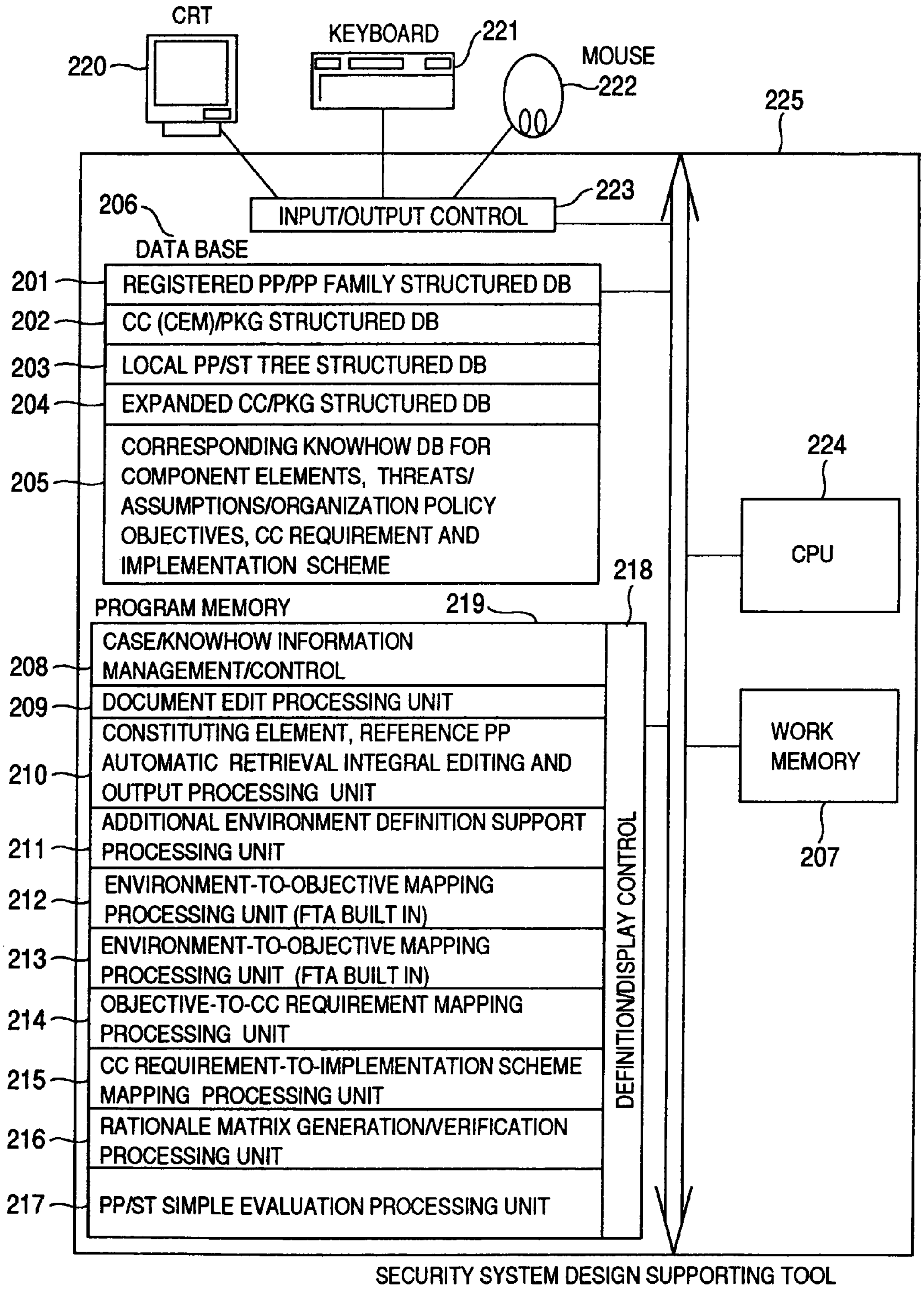
FIG. 2 is a diagram showing a configuration of a security system design supporting tool.

FIG. 2 is a block diagram showing a configuration of a security system design supporting tool according to this invention.

The security system design supporting tool 225 according to the invention comprises a database 206, a program memory 219, a CRT 220 for displaying a definition screen and an evaluation result screen, a keyboard 221 and a mouse 222 for inputting for PP/ST editing and selecting and setting the related information, an input/output control unit 223 for controlling the inputs/outputs, and a CPU 224 for access to the input/output, the database and executing the programs.

The database 206 includes a registered PP/PP family tree structured database 201 for capturing the registered PPs and the PPs of the PP family as an object class of an object-oriented design and storing each PP in a class tree structure based on the class inheritance between the PPs, a CC (CEM)/PKG structured database 202 for storing the CC requirement components, the CEM evaluation components and the registered packages in accordance with the hierarchical structure between the class family components and between the components of the reference specification, a local PP/ST tree structured database 203 for storing each existing PP/ST not registered as a reference in a class tree structure based on the class inheritance between PP/STs like in the aforementioned database, an expanded CC/PKG structured database 204 for storing the CC requirement components and PKGs uniquely defined for addition and expansion for lack of reference registration, and a corresponding knowhow database 205 for storing, as partial cases of past PP/ST generation, the corresponding case parts for the threats (including the occurrence probability/risk data), assumptions and organizational policies related to the component elements of the TOE product or system, the corresponding case parts of the security objectives (including the protection cost/risk acceptance data) related to each of the threats, assumptions and organizational policies, the corresponding case parts of the CC requirement components related to the security objectives and the corresponding case parts of the implementation schemes related to the CC requirement components.

Also, the program memory 219 stores such programs as a case/knowhow information management/control unit (program) 208 for controlling the information retrieval and registration of the database 206, a PP/ST document edit processing unit 209, a component element-reference PP automatic retrieval/integral edit output processing unit 210, an additional environment definition support processing unit 211, an environment-to-objective mapping processing unit 212, an optimal objective determination processing unit 213, an objective-to-CC requirement mapping processing unit 214, a CC requirement-to-implementation scheme mapping processing unit 215, a rationale matrix generation and verification processing unit 216, a PP/ST simple evaluation processing unit 217, and a definition/display control unit 218 for controlling the definition, editing and display processing of the PP/ST documents.

Now, an example of operation for generating the PP/ST with a security system design supporting tool according to this invention will be explained with reference to FIGS. 1 to 9.

Figure 3:
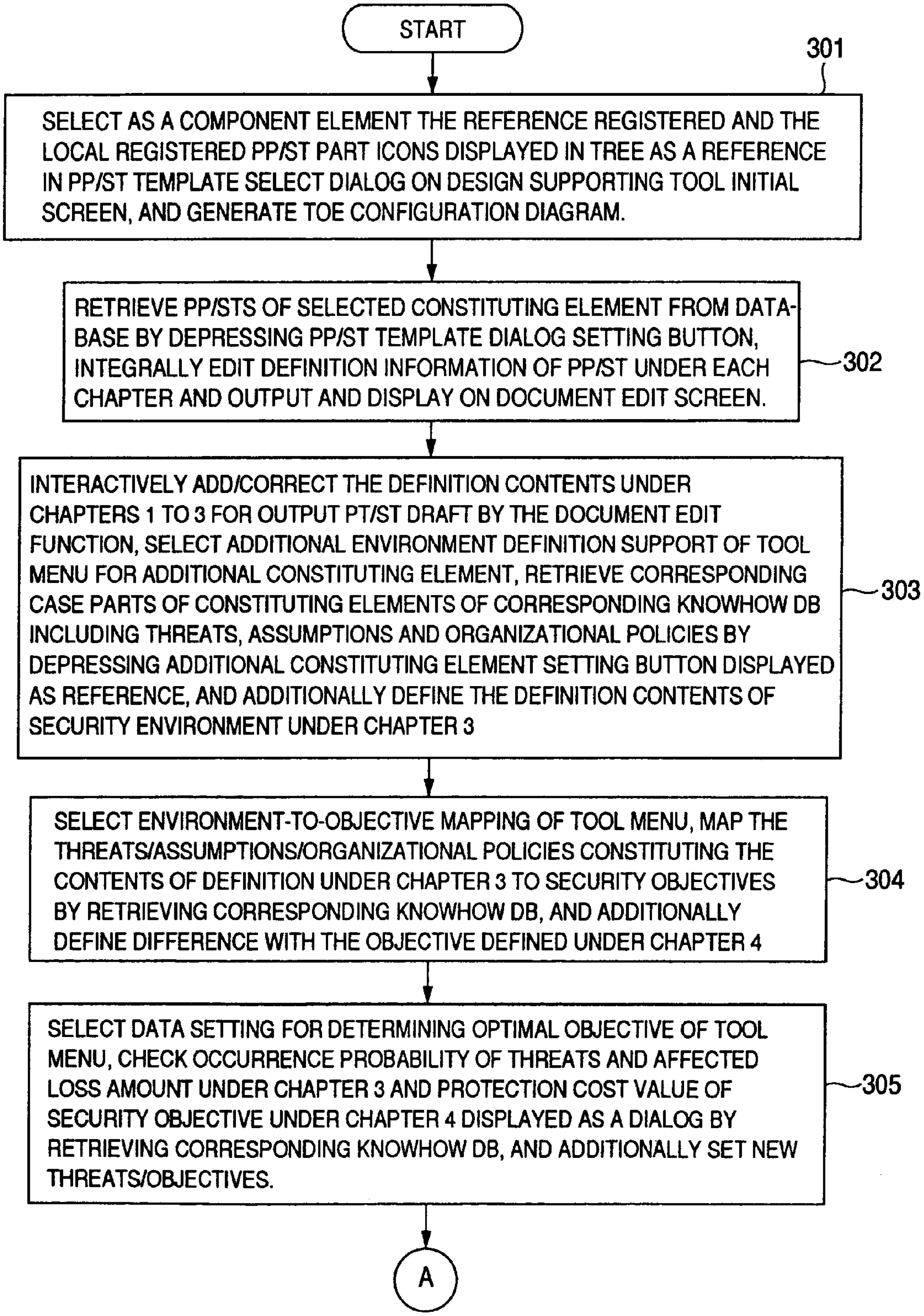
FIG. 3 is an operation flowchart showing the process for preparing the PP/ST.
Figure 4:
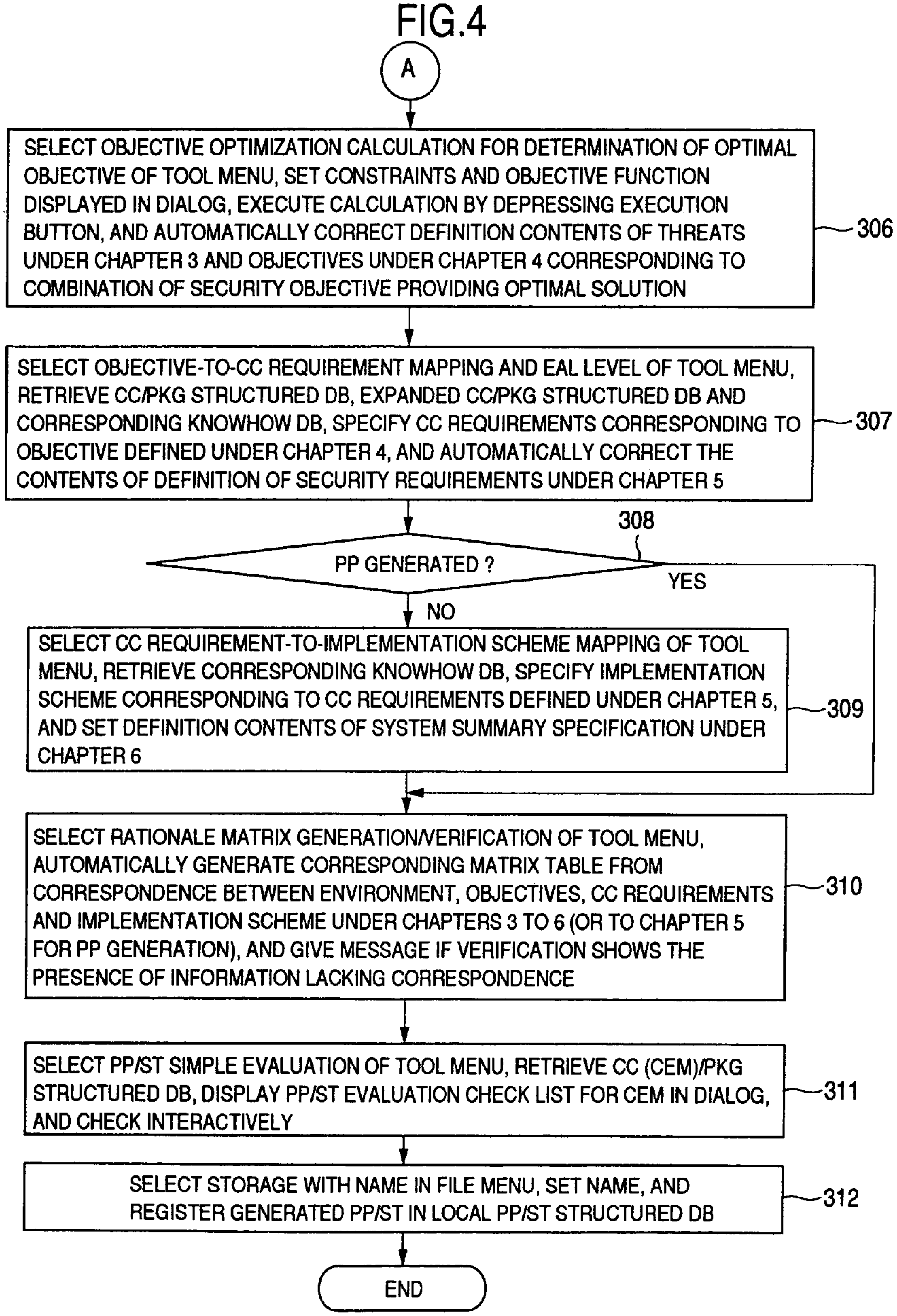
FIG. 4 is an operation flowchart showing the process for preparing the PP/ST.

FIGS. 3 and 4 are flowcharts showing the operation for the process of generating the PP/ST using the design supporting tool according to this invention. These flowcharts will be explained in that order below.

Figure 5:
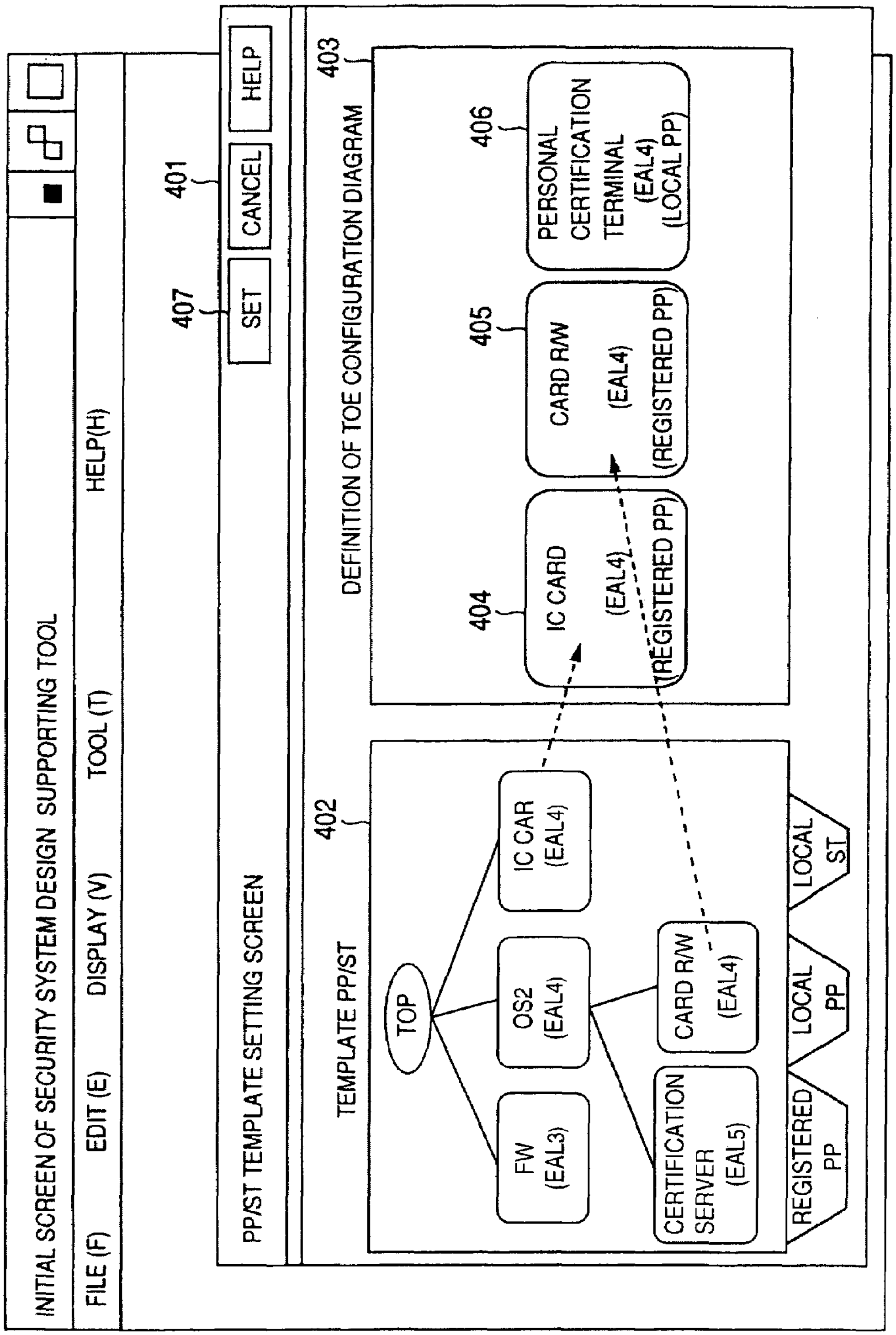
FIG. 5 is a diagram showing a PP/ST template setting screen according to an embodiment.

Step 301:

In a PP/ST template select dialog 401 displayed in the initial screen by retrieving the registered PP/PP family structured database 201 and the local PP/ST tree structured database 203 included in the database 206 of the design supporting tool on the CRT 220 shown in FIG. 5, the user performs the select, drag and drop operations by a mouse 222 for the component elements of the icons 402 of the PP/ST parts in reference registration and local registration displayed in tree from indicating the inheritance between PP/STs thereby to generate a configuration diagram of the TOE product or system.

A table structure with high-order PP/STs linked with pointers based on the inheritance tree between the PP/STs registered and/or generated in the past is stored in the registered PP/PP family structured database 201 and the local PP/ST tree structured database 203. Each table has registered therein the PP/ST identification including the PP name, version information and the date of issue described on the cover of each PP/ST, the certification level and the PP/ST document file.

The PP/ST part icon 402 is expressed using the name of the PP/ST of the identification and the certification level information, and the tree form is displayed using the high-ranking PP/ST pointer link.

In the absence of an element coinciding with the TOE component elements in generating a TOE structure diagram, the nearest one, if any, of the elements of the generic concept is selected by reference to the inheritance of the tree presentation.

In the case where an IC card system of the certification level 4 (EAL4) is used as a TOE as shown in FIG. 5, the IC card PP404 of EAL4 and an IC card reader/writer (R/W) PP405 are selected as component elements from a registered PP template, and a personal certification terminal PP406 of EAL4 is selected as a component element from a local PP template.

Figure 6:
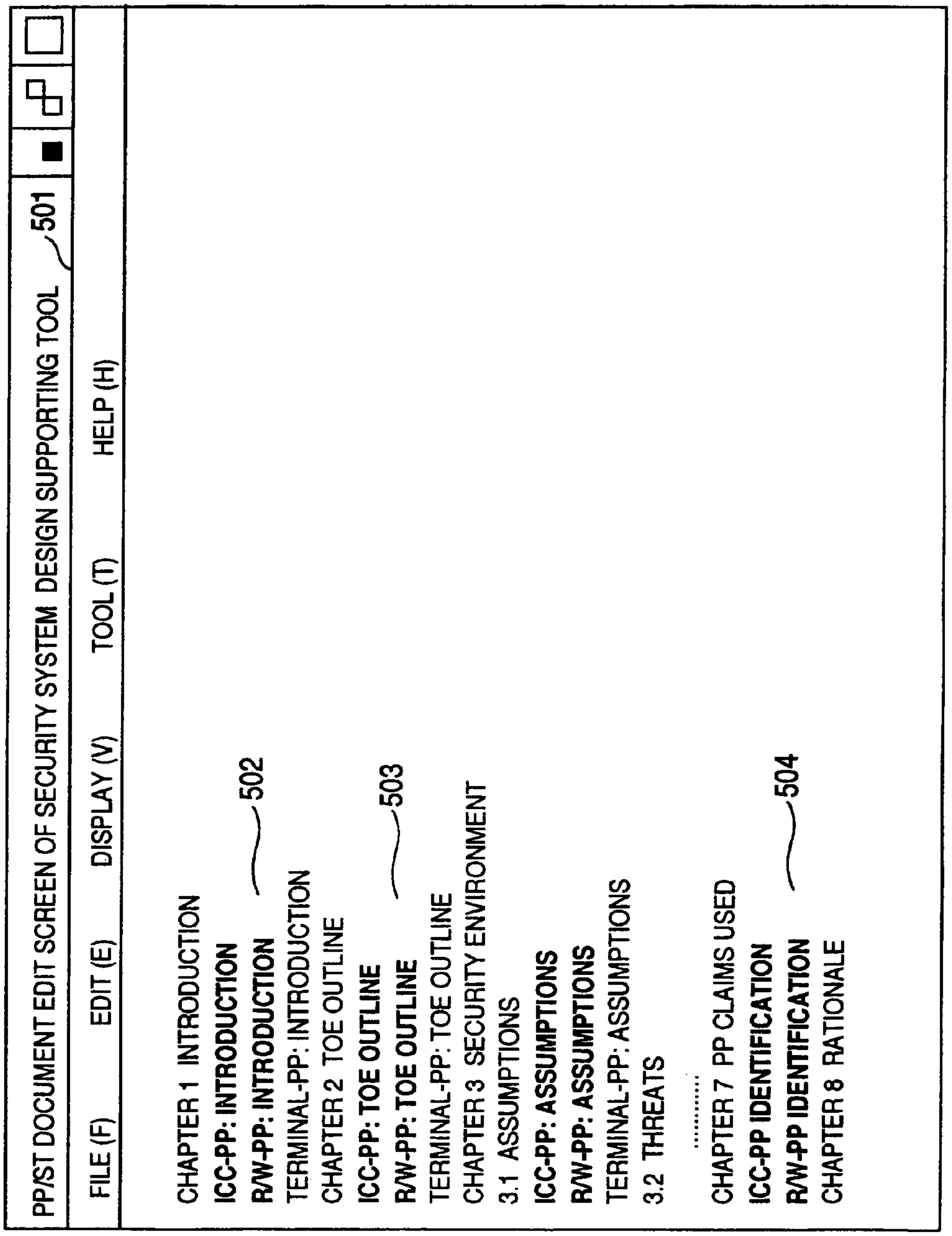
FIG. 6 is a diagram showing a PP/ST document editing screen according to an embodiment.

Step 302:

After generation of the structure diagram, depress the setting button 407 in the template dialog. The component element/reference PP automatic retrieval/integral edit output processing unit 210 searches the registered PP/PP family structured database 201 and the local PP/ST tree structured database 203 of the database 206 through the case/knowhow information management/control unit 208 for the PP/STs of the selected component elements, and the definition information for each chapter of the selected PP/STs is duplicated and integrally edited so that the resulting output is displayed on the PP/ST document edit screen 501 as shown in FIG. 6 by the definition/display control unit 218.

The definition information extracted from the registered PP is displayed in a bold character display 502, and the definition information extracted from the local PP/ST is displayed in an ordinary character display 503 in the form of the registered information and the local information separately from each other. This is in order to facilitate the identification of the registered PP information which cannot be changed and required to be used as it is.

For the PP claims under chapter 7, on the other hand, only the PP identification (PP name, version information, date of issue) 504 only for such a claim selected as the registered PP is edited and defined.

As a result, the PP/ST draft is automatically generated for the TOE using the existing PP/ST case as a template.

Step 303:

The contents of definition of the output PP/ST draft under Chapters 1 to 3 are added to or corrected interactively by the document edit processing unit 209. Also, for the additional component elements, the additional environment definition support 602 of the tool menu 601 is selected, and the additional elements are selected by the additional environment definition support processing unit 211 from the additional component element candidate list dialogue (the new elements and the corresponding environmental information definition input are input from the keyboard 221 as new component elements in the absence of the candidate list) displayed with reference to the component elements in the component element/environment correspondence table 701 of the corresponding knowhow database 205 as shown in FIG. 8. Then, the setting button is depressed, so that the case parts corresponding to the component elements, i.e. the threats, the assumptions and/or the organizational policies are retrieved from the component element/environment correspondence table 701 thereby to additionally define the contents of the definition of the security environment under Chapter 3.

Figure 7:
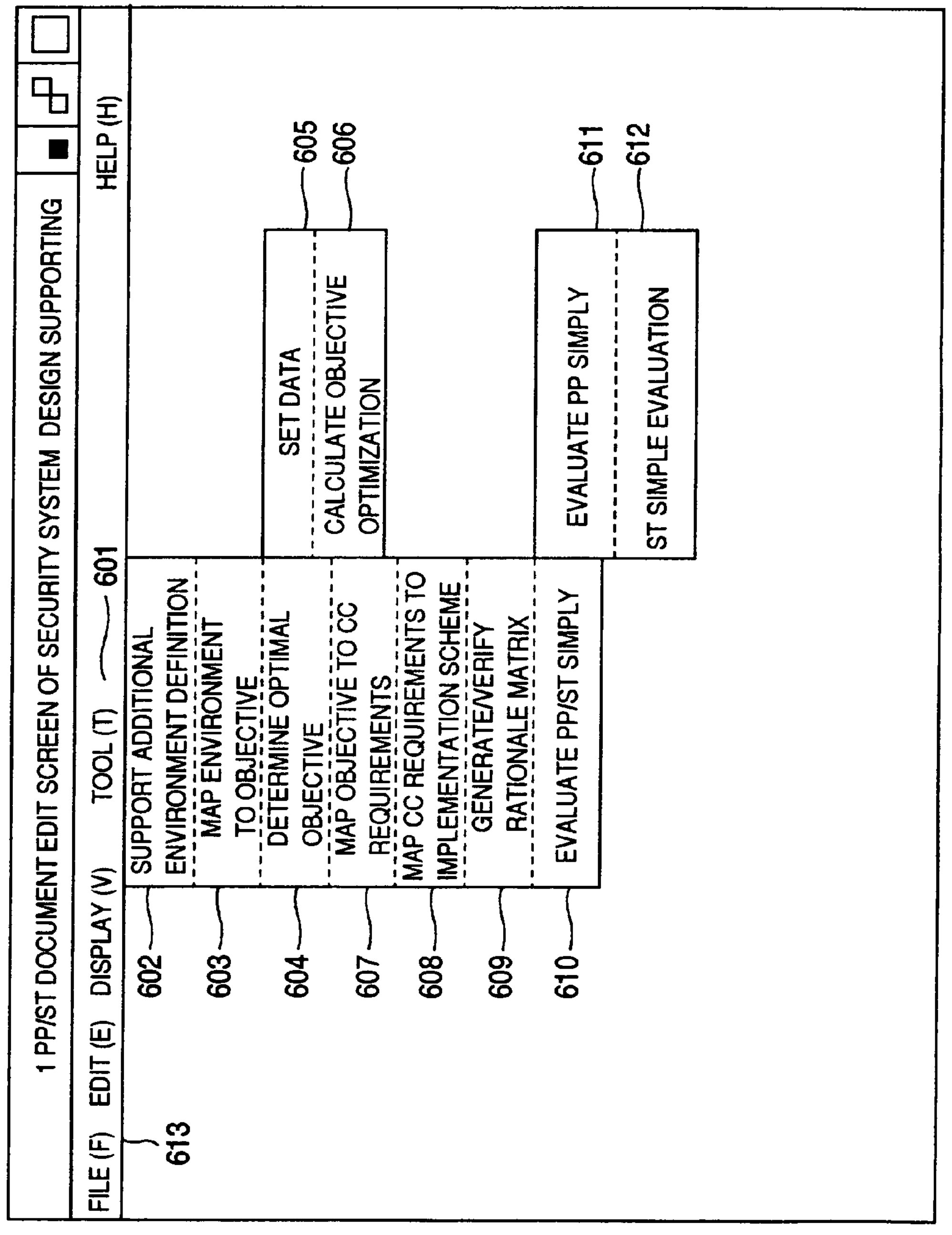
FIG. 7 is a diagram showing a tool menu select screen according to an embodiment.

Step 304:

By selecting the environment-to-security objective mapping 603 in the tool menu 601 shown in FIG. 7, the environment-to-security objective mapping processing unit 212 retrieves the environment-security objective correspondence table 702 of the corresponding knowhow database 205 (FIG. 8) for mapping the threats, assumptions and organizational policies constituting the definition contents under Chapter 3 to the security targets, thereby additionally defining the difference with the defined security objective under Chapter 4.

In this case, as a security objective against each threat of the environment-security objective correspondence table 702, a combination of the proposed protection targets corresponding to necessary and sufficient factors to prevent the occurrence of the threats (minimal path sets: elements in the parentheses of 703 in FIG. 8 constitute proposed protection targets one of two of which can be used against the threats) is stored. The same protection target may be used against a plurality of threats.

In the case of a new environment not existing in the database, the new environment-security objective correspondence input dialog is displayed, and a corresponding security objective is input by the keyboard 221 thereby to add to the environment-security objective correspondence table 702.

In the process, for definition of the security objective corresponding to a new threat, a FT (fault tree) with a threat as the top event is generated in collaboration with a FTA (fault tree analysis) tool according to the prior art, and a basic event (factor) for the top event is identified. A combination of the basic events constituting the minimal path set is determined by the minimal path set calculation, and thus the security objective against the basic event for each set is defined. In this way, a combination of security objectives against the threats is introduced and additionally stored.

Step 305:

The data setting 605 of the optimal security objective determination 604 of the tool menu 601 is selected, and the optimal security objective determination processing unit 213 displays a dialog by retrieving the threat data table 704 and the protection cost data table 705 of the corresponding knowhow database 205. The probability of occurrence of the threat and the affected loss amount defined in Chapter 3 and the protection cost value for the security target under Chapter 4 are checked, so that the data of a new threat and a new security objective for which data is not yet set are additionally set interactively.

In the process, the data on the probability of occurrence of a new threat is analytically determined and set in such manner that the probability of occurrence of the basic event of FT with the generated threat as the top event is input again in collaboration with the FTA tool used previously for defining the corresponding target, and the calculation is executed for introducing the probability of occurrence of the top event.

Figure 9:
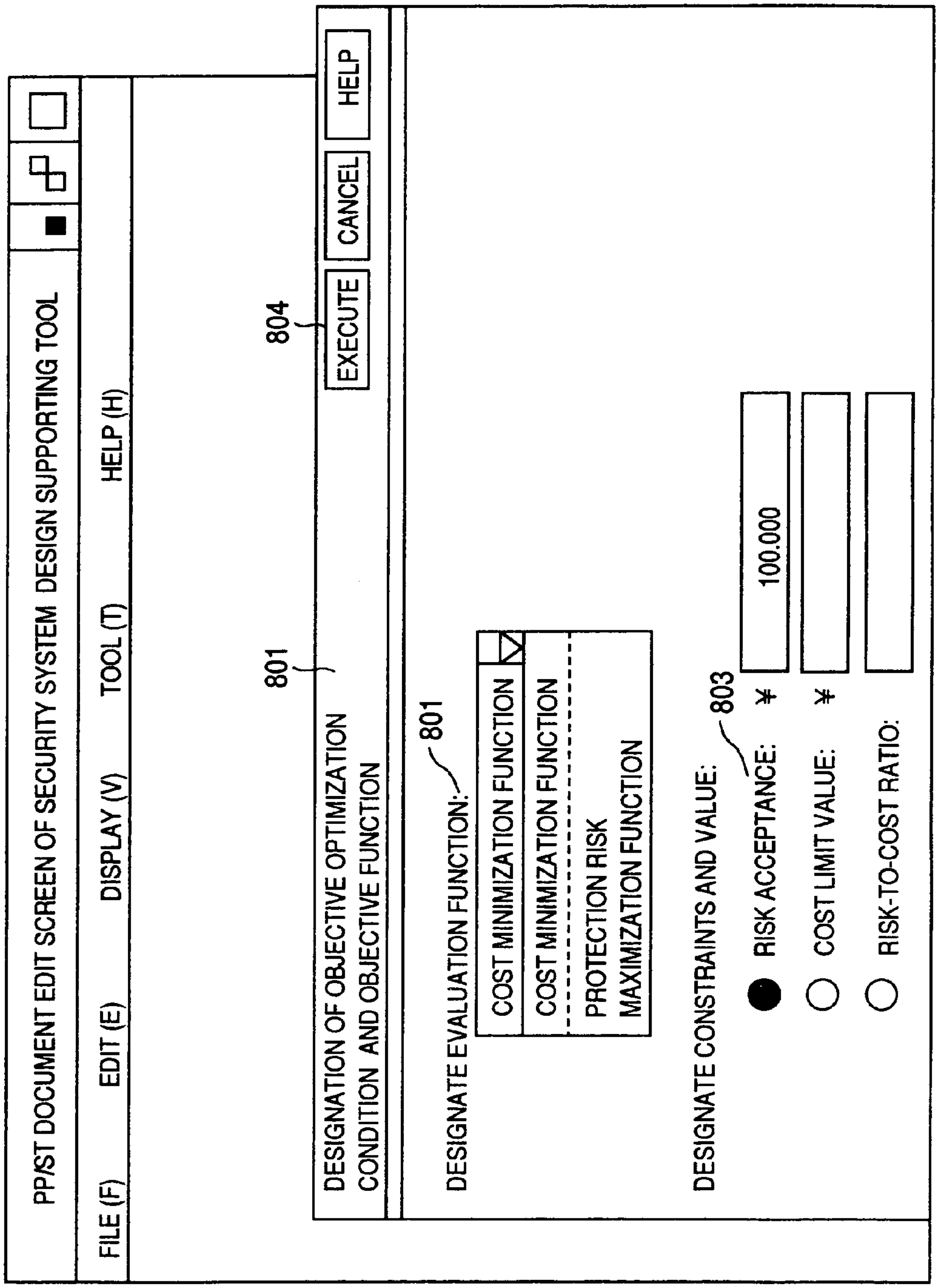
FIG. 9 is a diagram showing a condition/objective function designating screen according to an embodiment.

Step 306:

The security objective optimization calculation 606 in the optimal security objective determination 604 of the tool menu 601 is selected, and displayed as a dialog display 801 as shown in FIG. 9 by the optimal security objective determination processing unit 213. The constraint 803 and the objective function 802 are set, and the execution button 804 is depressed. The calculation is executed by retrieving the threat data table 704 and the protection cost data table 705 of the corresponding knowhow database 205. Thus, the contents of the definition of the threats under Chapter 3 and the security objectives under Chapter 4 are automatically corrected based on the threat corresponding to the combination of the security targets constituting the optimal solution.

As the objective function 802, the cost minimization function for minimizing the protection cost of the security target or the protection risk maximization function for maximizing the total sum of the risks (probability of threat occurrence multiplied by the affected loss amount) of the threat protected by the security objective is selected. As the constraint 803, on the other hand, the risk acceptance value for removing the threat of the risk not more than a designated value from the protective measures as an acceptance or a cost limit value for maintaining the total sum of the protection cost to not more than a designated value and/or the cost-to-risk ratio for designating the cost effectiveness (the ratio of 1 minimizing the total sum of the residual loss and the protection cost) of the residual loss amount and the protection cost in terms of the ratio of the total residual threat risk not protected to the total protection cost are selected.

In the presence of a threat and a security objective against the threat referred to by the registered PP in Chapters 3 and 4 before renewal, the optimization calculation is performed taking the employment of these constraints of the optimization problem into account.

This is by reason of the fact that the reduction of the contents of the definition of the registered PP is not allowed in generating a new PP/ST with reference to the registered PP.

In the case where the registered PP can be deleted from the reference PP, however, the aforementioned factors need not be included in the constraints for the optimization problem but the identification of the registered PP is deleted from the description of the PP claims used under Chapter 7.

This selection is interactively set by giving a message as to whether the referencing of the registered PP can be canceled before the optimization calculation.

The calculation for determination of the optimum security objective described above is for determining and solving the problem of optimization of the combination between a set objective function and a security target reflecting the constraints.

Assume, for example, that the threat under Chapter 3 is T-1 (the occurrence probability of 0.1, the affected loss amount of 100,000,000 yen, and the risk value of 10,000,000 yen), T-2 (the occurrence probability of 0.1, the affected loss amount of 50,000,000 yen, and the risk value of 5,000,000 yen), T-3 (the occurrence probability of 0.2, the affected loss amount of 5,000,000 yen, and the risk value of 1,000,000 yen) or T-4 (the occurrence probability of 0.01, the affected loss amount of 10,000,000 yen, and the risk value of 100,000 yen); that the objective under Chapter 4 is 0-1 (the protection cost of 1,000,000 yen) 0-2 (the protection cost of 100,000 yen), 0-3 (the protection cost of 200,000 yen), 0-4 (the protection cost of 300,000 yen), 0-5 (the protection cost of 200,000 yen), 0-6 (the protection cost of 150,000 yen), 0-7 (the protection cost of 400,000 yen), 0-8 (the protection cost of 600,000 yen), 0-9 (the protection cost of 1,000,000 yen) or 0-10 (the protection cost of 800,000 yen); and that the combination of objectives for T-1 is (0-1, 0-2) (0-3), the combination of objectives for T-2 is (0-4, 0-6) (0-2, 0-5), the combination of objectives for T-3 is (0-2, 0-3) (0-7), and the combination of objectives for T-4 is (0-8, 0-9) (0-10).

In this case, the calculation for determining the optimal objective is executed by setting the cost minimization function as an objective function and the risk acceptance of 100,000 as a constraint. First, in view of the risk acceptance of 100,000, the threat T-4 having the risk value of 100,000 yen is deleted. At the same time, the corresponding objectives 0-8, 0-9, 0-10 for T-4, which are not related to other threats, are also deleted.

Thus the optimization problem is to determine a combination of 0-1 to 0-7 usable as a protective measure against the remaining threats of T-1 to T-3 at minimum cost. This problem can be regarded as the combinatorial optimization problem expressed by the following formula (1) of the objective function for optimization and the formulae (2) and (3) of constraints for optimization.

$$\text{Minimize: } Z=\sum_{q=1}^{m} C(q)\circ obj(q) \tag{1}$$

$$\sum_{k=1}^{n}\left[1-\prod_{j=1}^{pk}\prod_{q\in Pk,j} obj(q)\right]=0 \tag{2}$$

$$obj(q)\epsilon\{1,0\},(1;\text{accept},0;\text{reject}) \tag{3}$$

The objective function formula indicates the selection of an objective associated with minimum cost, the former constraint formula for optimization is for protecting all the threats involved by a combination of selected objectives, and the latter constraint formula for optimization indicates the advisability of employing the objective q.

In the formulae, C(q) is the protection cost for the objective q, m is the number of candidates for security objectives, obj(q) is a variable indicating whether the objective candidate q is to be employed or not, n is the number of the threats involved, pk is the number of objective combinations of the threat k, and Pk,j is the jth objective combination of the threat k.

The optimization problem described above is processed by a solving method such as the implicit enumeration algorithm. Then the minimum value of the protection cost equivalent to 750,000 yen can be determined for the employed objective of 0-2, 0-3, 0-4 or 0-6 as an optimal solution.

The objective 0-3 corresponds to T-1, the objectives 0-4, 0-6 correspond to T-2, and the objectives 0-2, 0-3 correspond to T-3.

It follows therefore that T-1 to T-3 are determined as threats under Chapter 3 and that 0-2, 0-3, 0-4 and 0-6 are determined as objectives under Chapter 4, thereby updating the contents of the definition under Chapters 3 and 4.

Step 307:

The objective-to-CC requirement mapping 607 of the tool menu 601 is selected and displayed in dialog. By setting the EAL level, the objective-to-CC requirement mapping processing unit 214 retrieves the objective-CC requirement correspondence table 706 of the corresponding knowhow database 205 and specifies the CC functional requirement corresponding to the objective under Chapter 4. At the same time, the CC/PKG structured database 202 and the expanded CC/PKG structured database 204 are retrieved and the CC assurance requirements for the designated EAL level are specified thereby to automatically correct the contents of definition of the security requirements under Chapter 5.

The result of automatic correction is used for verifying the logic matching with the dependency or hierarchy between the CC requirements defined in the CC information of the CC/PKG structured database 202, and the correction of unmatched points is expedited interactively through a message.

In correcting the contents of the definition, assume that the reference requirements from the registered PP of the requirement definition under Chapter 5 are to be deleted. In the case where the reference to the registered PP is to be kept active, the particular reference requirements are not deleted, while in the case where the registered PP can be deleted from the reference PP, on the other hand, the identification of the particular registered PP is deleted from the description of the PP claims used under Chapter 7.

This selection is interactively set in response to a message as to whether the reference to the registered PP can be canceled before automatic correction.

Step 308:

In generating ST, the CC requirement-to-implementation scheme mapping 608 of the tool menu 601 is selected. Then, the CC requirement-to-implementation scheme map processing unit 215 retrieves the CC requirement-implementation scheme correspondence table 707 of the corresponding knowhow database 205, and specifies the implementation scheme corresponding to the CC requirements defined under Chapter 5 thereby to set the contents of the definition of the summary system specification of Chapter 6. Step 309:

In the case where the existing ST is referred to, however, the contents of the definition exists before setting. Therefore, the specified contents are set and the contents of definition before setting are displayed as a guidance, and while comparing them, the set contents are corrected by the document edit processing unit 209 interactively.

In generating PP, this operation is skipped and the process is transferred to the rationale matrix generating step 310.

Step 310:

Upon selection of the rational matrix generation/verification 609 of the tool menu 601, the rationale matrix generation/verification processing unit 216 automatically generates a corresponding matrix table based on the correspondence between the items including the environments, objectives, CC requirements and implementation schemes under Chapters 3 to 6 (or to Chapter 5 for PP generation), and verifies the presence or absence of the information lacking correspondence. In the case where the information lacking correspondence exists, a message is given for interactive correction by the document edit processing unit 209.

Step 311:

In the PP/ST simple evaluation 610 of the tool menu 601, the PP simple evaluation 611 is selected for PP and the ST simple evaluation 612 is selected for ST. The PP/ST simple evaluation processing unit 217 retrieves the CC (CEM)/PKG structured database 202 and displays the PP/ST evaluation check list of CEM in dialog in the form of questions, so that the OK/NG check boxes are filled by way of the mouse 222 interactively thereby to perform the simplistic evaluation of the PP/ST generated.

Step 312:

The storage with name in the file menu 613 is selected and a name is set, so that the generated PP/ST is registered in the local PP/ST structured database 203 by the case/knowhow information management and control unit 208.

This embodiment produces the following effects.

The proper PP/ST to be referred to as a TOE can be easily selected from the case PP/ST icons displayed in tree based on the registered PPs, the past cases of PP/ST preparation, the inheritance between the PP/STs or the parts thereof. This is reused as a template or a part or utilized as reference information, so that even designers not equipped with the special knowledge, knowhow or technique for CC, threat protection or risk analysis can generate the PP/ST.

A CC-based security system design support can be realized in which the number of generation steps is reduced for an improved efficiency or a uniform generation quality is secured by automatic generation of the draft and semi-automatic generation by addition or correction.

The optimal objective determining means can generate a PP/ST high in cost effectiveness, and the self evaluation by the PP/ST simple evaluation means can reduce the loss of evaluation by an official evaluation body for a reduced evaluation cost.

The template cases and case parts can be expanded and improved while using the tool by the means for storing the generated PP/STs and information on the generation process in the database.

Figure 10:
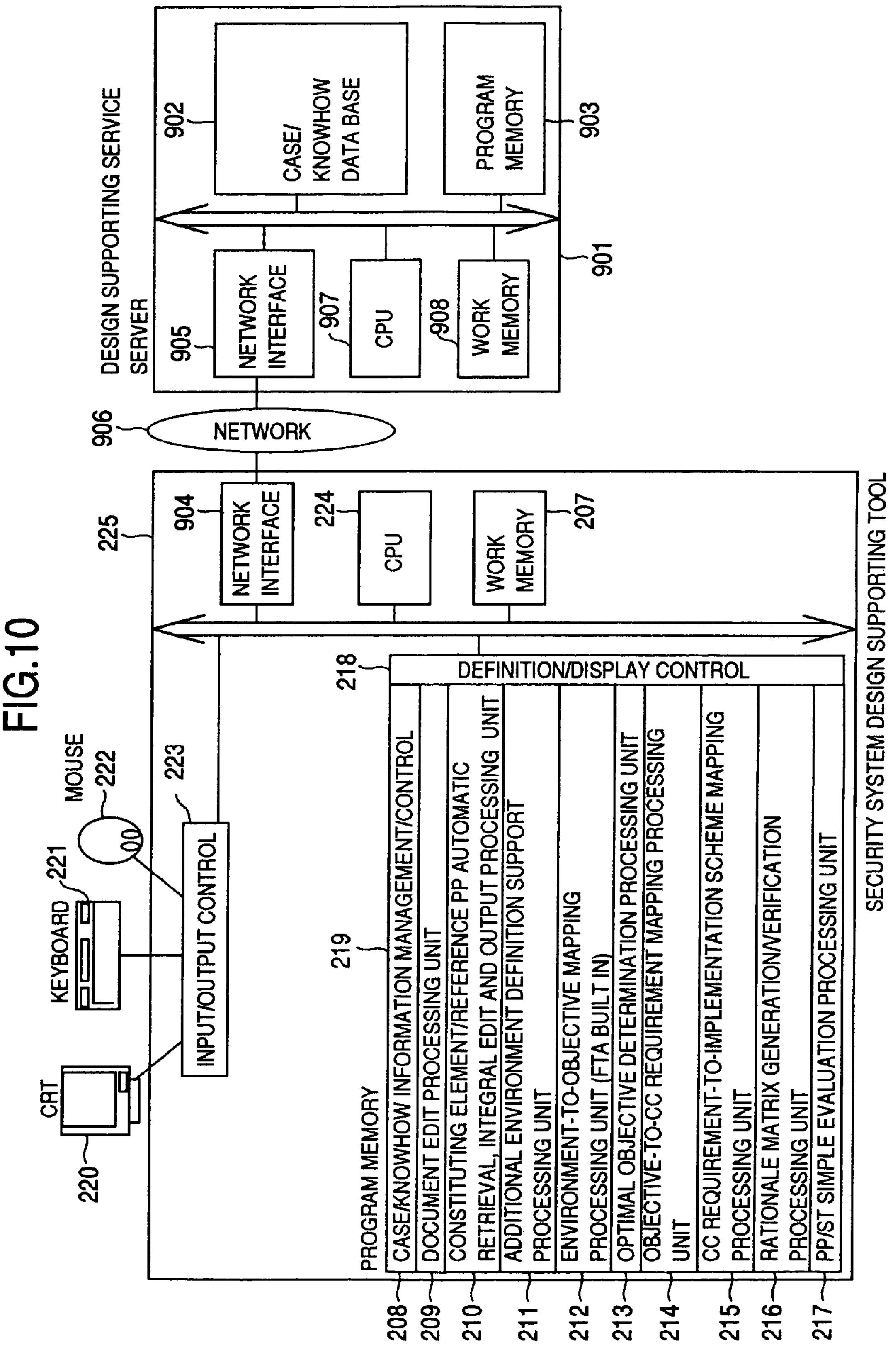
FIG. 10 is a diagram showing a configuration of a network-type security design supporting system.

Now, a second embodiment of the invention will be explained. This embodiment represents a case in which a security system design supporting service is provided in the form of network connection as shown in the system configuration diagram of FIG. 10. The system operation is similar to that of the first embodiment. The features of the configuration shown in FIG. 10 are described below.

A design supporting service server 901 is provided and the same case/knowhow information is stored in the database 902 in the server as in the database 206 of FIG. 2.

The same design supporting programs are stored in the program memory 903 in the server as in the program memory 219 of FIG. 2 and shared by a plurality of users.

With the aforementioned configuration, each user can access to the design supporting service server 901 through the network 906 byway of network interfaces 904, 905 from a client 225 thereof. The CPU 907 and the work memory 908 on the server side are utilized by downloading the design support processing programs from the program memory 903 in the server to the program memory 219 of the client 225 or by remote access to the design support processing programs of the program memory 903. These operations realize the supporting of the PP/ST generation by retrieving and referencing the case/knowhow information in the database 902.

According to this embodiment, the registered and past PP/ST generation cases and parts information can be shared and reused/utilized effectively. Also, the server management makes it possible to utilize the latest information without imposing the load of information updating on the users.

Further, the use of the information by network connection can provide a PP/ST generation supporting service not limited by the place of use.

Figure 11:
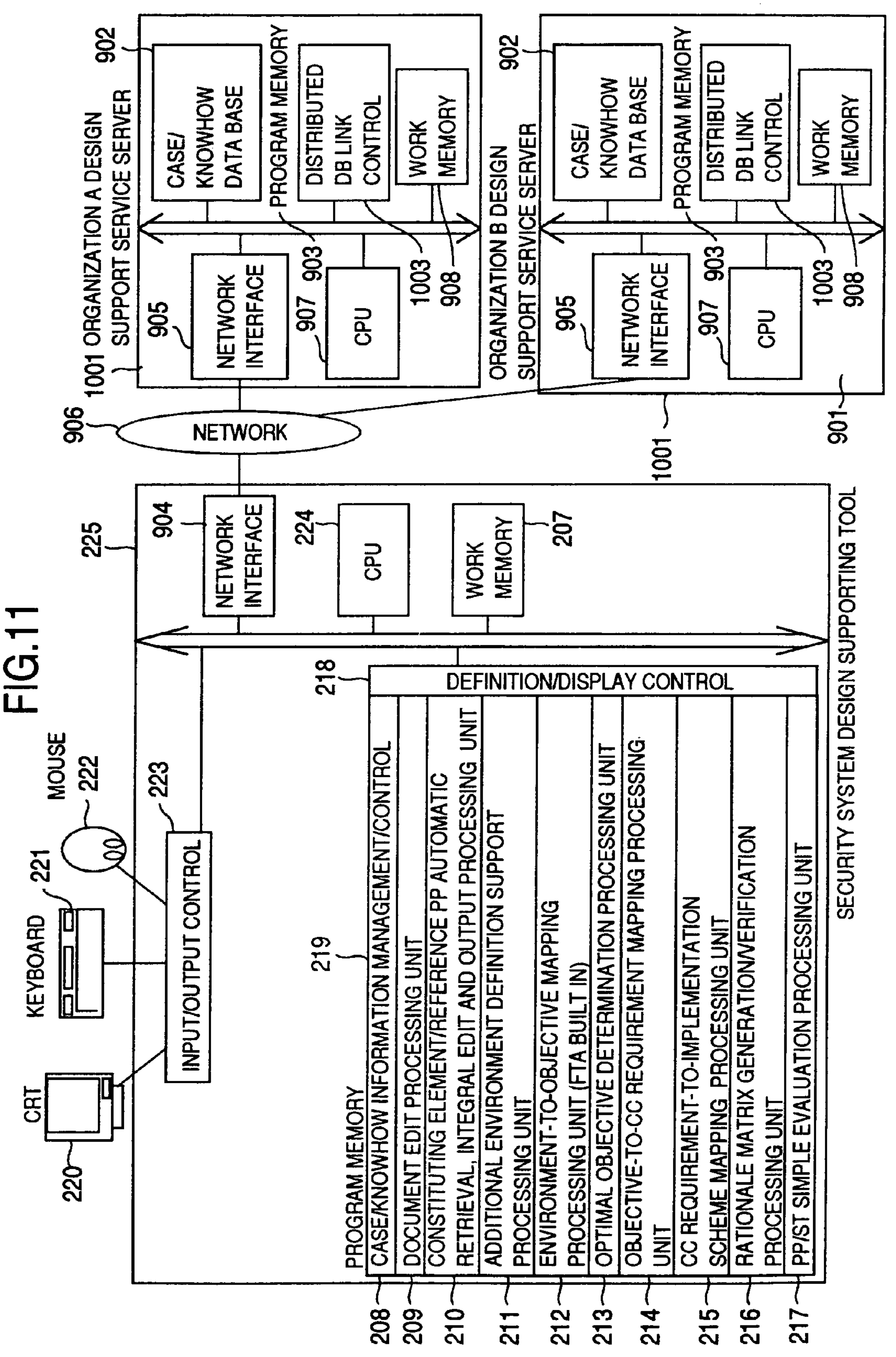
FIG. 11 is a diagram showing a configuration of a security design supporting system of horizontal distributed network type.

Now, a third embodiment of the invention will be explained. This embodiment represents a case in which a security design supporting service is provided in the form of horizontally (parallel) distributed network connection as shown in the configuration diagram of FIG. 11. The system operation is similar to that of the first and second embodiment. The configuration shown in FIG. 11 has the following features.

A plurality of design supporting servers 1001, 1002 are provided for each organization.

Distributed database link control units 1003, 1004 are provided in the program memory 903 in the server. The distributed database link control unit 1003, 1004 realize the support of the PP/ST generation by retrieving and referencing the case/knowhow information with the case/known databases of a plurality of organizations as a virtual integrated database through the network 906.

According to this embodiment, the registration and the past PP/ST generation cases and the parts information for each organization can be shared and reused/utilized effectively. Also, the provided information can be improved and a uniform PP/ST generation is made possible for a specific organization group or a specific industry as a whole.

Figure 12:
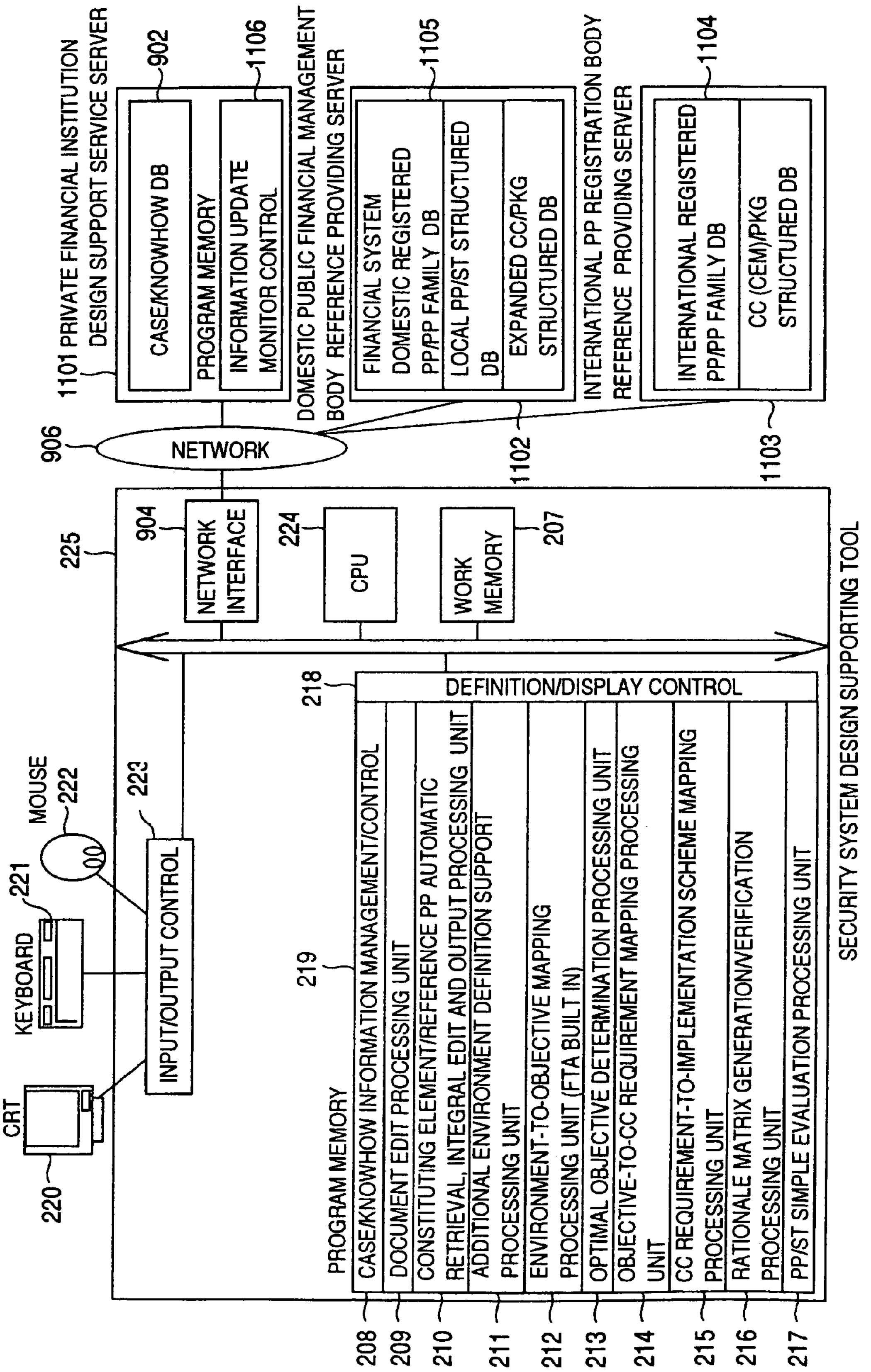
FIG. 12 is a diagram showing a configuration of a security design supporting system of vertical distributed network type.

Now, a fourth embodiment of the invention will be explained. This embodiment represents a case in which a security system design supporting service of vertical (hierarchical) distributed network type is provided for a financial information system. The system operation is similar to that of the first to third embodiments. The configuration of FIG. 12 has the features described below.

A private financial institution is equipped with a design supporting service server 1101, a domestic public financial management body is equipped with a reference providing server 1102, and an international PP registration body is equipped with an international reference providing server 1103.

A registered PP/PP family structured database and a CC (CEM)/PKG structured database are stored in the database 1104 of the reference providing server 1103 of the international PP registration body.

A financial system domestic registration PP/PP family structured database, a local PP/ST structured database and an expanded CC/PKG structured database generated and registered specifically for a domestic financial system such as the ATM, the bank settlement system or the internet banking system are stored in the database 1105 of the reference providing server 1102 of a domestic public financial management body.

The program memory of a private financial institution design supporting service server 1101 includes an information update monitor control unit 1106.

The information update monitor control unit 1106 monitors the updating of the information in the international body server 1103 and the domestic body server 1102, and upon detection of an updating, the information is downloaded to the private institution server 1101. Also, the supporting of the PP/ST generation is realized by retrieving/referencing, through the network 906, the case information differently specified for application fields or the hierarchical levels of the international bodies and domestic financial institutions.

According to this embodiment, the PP/ST generation cases and the parts information for application fields and registration specific to each institution or body are managed with servers separate from the supporting tool, and therefore, the information management load on the tool can be reduced, thereby making it possible to provide the latest information. Also, the information sharing specific to each application field permits the information to be supplied more suitably and effectively to the user in a specified field.

Now, an explanation will be given of a case in which the case/knowhow information for PP/ST generation is used as portable means according to a fifth embodiment of the invention with reference to FIG. 13.

Figure 13:
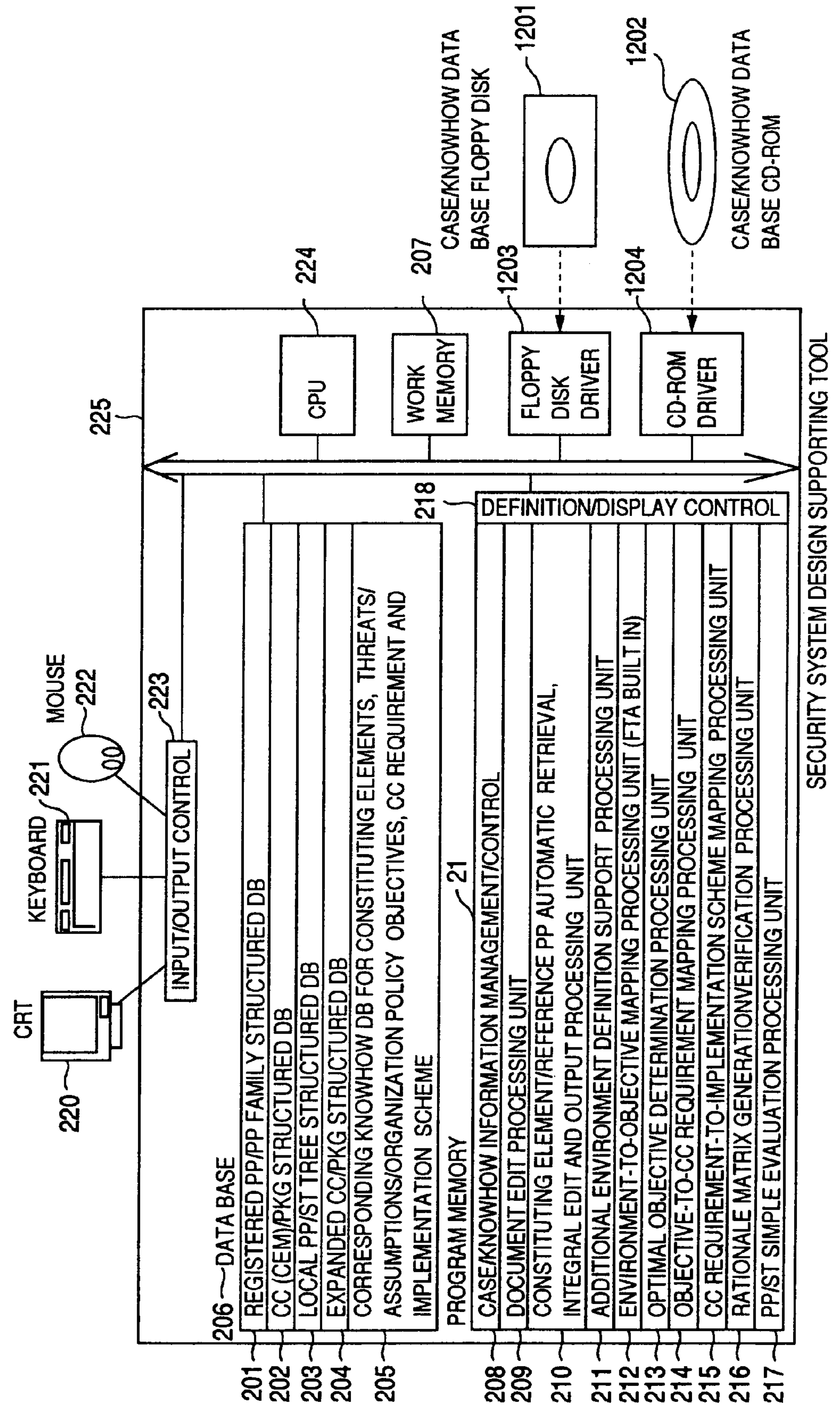
FIG. 13 is a diagram showing a configuration of a security deign supporting tool of portable case utilization type.

FIG. 13 shows a configuration of a portable security system design supporting tool for case utilization.

The system operation is similar to that of the first and second embodiments. The features of the configuration shown in FIG. 13 are as follows.

The PP/ST-related case/knowhow information stored in the database 206 of the tool is registered in a portable storage medium such as a case/knowhow database floppy disk 1201 or a case/knowhow database CD-ROM 1202 shown in FIG. 13.

As a result, the supporting of the PP/ST generation can be implemented by referencing the case information on a security system design supporting tool carrying the case/knowhow database information and having built therein the floppy disk driver 1203 or the CD-ROM driver 1203.

According to this embodiment, even in the case where the PP/ST is generated or the system design consultation is offered at a destination such as a customer's office, the case/knowhow database information can be effectively utilized with the security system design supporting tool in the notebook-sized personal computer having built therein a floppy disk driver or a CD-ROM driver, thereby making it possible to provide a proposal or a consultation service high in quality.

According to this invention, in generating the security requirements and the security specifications in the stage of planning/designing an information system based on a given standard, the registered specifications and the past generation cases or parts thereof can be reused as templates or parts and effectively utilized as reference information.

Thus, even a designer not equipped with the special knowledge or knowhow or technique can generate the security requirements and security specifications. Further, a design support is realized which makes possible a remarkable improvement of the efficiency in terms of the number of generation steps and to secure a uniform generation quality.

Also, the security requirements and the security specifications with an optimal objective taking the cost into account can be generated and therefore a high effect of investment is expected.

The invention claimed is:

1. A security system design supporting method, implemented in a security system design supporting tool including a processor which conducts processings on data stored in memory, for supporting designing of security requirements or security specifications based on an international security evaluation criteria during planning/designing of an information-related product or an information system, said method comprising the steps of:

providing, in the memory, a template case database for storing protection profiles (PPs) that have been internationally registered or PPs or STs (security targets) that have been generated, and that have not been internationally registered, in a class-tree structure based on an inheritance relation between types of products or systems as a target of evaluation (TOE) of said PPs or STs;

specifying, to the processor, the PPs or STs related to the TOE by designating elements included in the products or systems, type and evaluation assurance level of the TOE, and retrieving a relevant class-tree structure from said database;

generating, by the processor, a PP or ST draft of the TOE by integrally editing contents of a definition of the specified PPs or STs, wherein as to the generated PP/ST draft of the TOE, if the registered PPs or STs or local PP matches PPs or STs retrieved from the database, the retrieved PPs or STs are used, and if there are no matches, high-order PPs or STs among the generated PPs or STs are retrieved based on an inheritance relation to thereby partially add and correct the PPs or STs;

generating a rationale matrix indicating a matrix table each correspondence between security environments, security objectives, security requirements and summary specification as a part of the contents of a PP or ST definition from the security environment, the security objectives, the security requirements and the summary specification or the correspondence between them; and verifying the presence or absence of the definition information lacking the correspondence using said rationale matrix generated.

2. A security system design supporting method, implemented in a security system design supporting tool including a processor which conducts processings on data stored in memory, for supporting designing of security requirements or security specifications based on an international security evaluation criteria during planning/designing of an information-related product or an information system, said method comprising the steps of:

providing, in the memory, a template case database for storing protection profiles (PPs) that have been internationally registered or PPs or STs (security targets) that have been generated, and that have not been internationally registered, in a class-tree structure based on an inheritance relation between types of products or systems as a target of evaluation (TOE) of said PPs or STs;

specifying, to the processor, the PPs or STs related to the TOE by designating elements included in the products or systems, type and evaluation assurance level of the TOE, and retrieving a relevant class-tree structure from said database;

generating, by the processor, a PP or ST draft of the TOE by integrally editing contents of a definition of the specified PPs or STs, wherein as to the generated PP/ST draft of the TOE, if the registered PPs or STs or local PP matches PPs or STs retrieved from the database, the retrieved PPs or STs are used, and if there are no matches, high-order PPs or STs among the generated PPs or STs are retrieved based on an inheritance relation to thereby partially add and correct the PPs or STs, wherein if the high-order PP among the generated PPs is not successful to match, the generated PP draft is registered in a local PP/ST tree structured database;

generating a rationale matrix indicating in a matrix table each correspondence between security environments, security objectives, security requirements and summary specification as a part of the contents of the PPs or STs definition from the security environment, the security objectives, the security requirements and the summary specification or the correspondence between them; and verifying the presence or absence of the definition information lacking the correspondence using said rationale matrix generated.

3. A security system design supporting method, implemented in a security system design supporting tool including a processor which conducts processings on data stored in memory, for supporting designing of security requirements or security specifications based on an international security evaluation criteria during planning/designing of an information-related product or an information system, said method comprising the steps of:

providing in the memory, a template case database for storing protection profiles (PPs) that have been internationally registered or PPs or STs (security targets) that have been generated, and that have not been internationally registered, in a class-tree structure based on an inheritance relation between types of products or systems as a target of evaluation (TOE) of said PPs or STs;

specifying, to the processor, the PPs or STs related to the TOE by designating elements included in the products or systems, type and evaluation assurance level of the TOE, and retrieving a relevant class-tree structure from said database;

generating, by the processor, a PP or ST draft of the TOE by integrally editing contents of a definition of the specified PPs or STs, wherein as to the generated PP/ST draft of the TOE, if the registered PPs or STs or local PP matches PPs or STs retrieved from the database, the retrieved PPs or STs are used, and if there are no matches, high-order PPs or STs among the generated PPs or STs are retrieved based on an inheritance relation to thereby partially add and correct the PPs or STs;

indicating the PPs or STs stored in the template case database as icons by which the constituting elements, type and the evaluation assurance level can be identified;

specifying the PPs or STs related to the TOE from the inheritance tree based on reference PP or ST cases of the inheritance between the PPs or STs expressed in a tree;

producing a structure diagram of the TOE using the icons of said specified PPs or STs as constituting elements;

generating a rationale matrix indicating in a matrix table each correspondence between security environments, security objectives, security requirements and summary specification as a part of the contents of the PP or ST definition from the security environment, the security objectives, the security requirements and the summary specification or the correspondence between them; and verifying the presence or absence of the definition information lacking the correspondence using said rationale matrix generated.

* * * * *